(12) United States Patent
Guérin et al.

(10) Patent No.: US 8,813,111 B2
(45) Date of Patent: Aug. 19, 2014

(54) PHOTOGRAPH-BASED GAME

(75) Inventors: Nicolas Guérin, Notre-Dame-de-Mésage (FR); Florent C. Perronnin, Doméne (FR); Craig John Saunders, Grenoble (FR); Sebastien Dabet, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/214,661

(22) Filed: Aug. 22, 2011

(65) Prior Publication Data

US 2013/0053141 A1     Feb. 28, 2013

(51) Int. Cl.
| | | |
|---|---|---|
| H04N 7/16 | (2011.01) | |
| G06K 9/68 | (2006.01) | |
| A63F 9/24 | (2006.01) | |
| A63F 13/12 | (2006.01) | |
| A63F 13/10 | (2006.01) | |

(52) U.S. Cl.
CPC ............. *A63F 13/10* (2013.01); *A63F 2300/69* (2013.01); *A63F 13/12* (2013.01); *A63F 2300/61* (2013.01); *A63F 2300/6009* (2013.01)
USPC ............. 725/19; 382/190; 382/218; 382/224; 463/42

(58) Field of Classification Search
CPC .... A63F 13/12; H04L 67/38; G06K 9/00281; G06K 9/00288; G06F 17/30244; G06F 17/30247; G06F 17/30277
USPC ............ 455/566.1; 463/2, 42, 9, 13; 473/409; 725/19; 382/190, 224, 218; 705/14.73
See application file for complete search history.

(56) References Cited

U.S. PATENT DOCUMENTS

| | | | |
|---|---|---|---|
| 4,508,353 A * | 4/1985 | Meyer et al. ...................... 463/2 |
| 7,313,276 B2 | 12/2007 | Simelius et al. | |
| 8,489,627 B1 * | 7/2013 | Brandt ........................ 707/765 |
| 2001/0049084 A1 | 12/2001 | Mitry | |
| 2003/0021481 A1 | 1/2003 | Kasutani | |
| 2003/0069832 A1 | 4/2003 | Czepluch | |
| 2004/0268381 A1 * | 12/2004 | Simelius et al. ................ 725/19 |

(Continued)

OTHER PUBLICATIONS

Lowe, Distinctive Image Features from Scale-Invariant Keypoints, University of British Columbia, Jan. 5, 2004, http://www.cs.ubc.ca/~lowe/papers/ijcv04.pdf.*

(Continued)

*Primary Examiner* — Dmitry Suhol
*Assistant Examiner* — Jason Yen
(74) *Attorney, Agent, or Firm* — Fay Sharpe LLP

(57) ABSTRACT

A system and a method for playing a photograph-based game are provided. The method includes establishing a communication link between a game playing system and one or more game playing devices, each of which is operated by a respective player. Game rules are presented to the player(s) on the respective game playing device(s). The game rules include at least one task for the submission of at least one photographic image. Provision is made for receiving a photographic image in the game playing system which has been submitted via the established link from the game playing device in response to the presented task. An image signature is computed for the submitted photographic image based on visual features extracted from the image and a relevance to the task is computed, based on the computed image signature. A score for the game is output for each player, based on the computed relevance of the submitted images for each of the tasks.

20 Claims, 4 Drawing Sheets

(56) References Cited

U.S. PATENT DOCUMENTS

| | | | |
|---|---|---|---|
| 2005/0108262 A1* | 5/2005 | Fawcett et al. | 707/100 |
| 2006/0015492 A1* | 1/2006 | Keating et al. | 707/4 |
| 2007/0005356 A1 | 1/2007 | Perronnin | |
| 2007/0202937 A1* | 8/2007 | Peires et al. | 463/9 |
| 2007/0243936 A1 | 10/2007 | Binenstock et al. | |
| 2007/0258648 A1* | 11/2007 | Perronnin | 382/224 |
| 2007/0270224 A1 | 11/2007 | Abbott | |
| 2008/0045339 A1 | 2/2008 | Lin | |
| 2008/0069456 A1 | 3/2008 | Perronnin | |
| 2008/0167079 A1 | 7/2008 | Garrettson et al. | |
| 2008/0240572 A1 | 10/2008 | Hoshii | |
| 2008/0313031 A1* | 12/2008 | Li et al. | 705/14 |
| 2008/0317358 A1 | 12/2008 | Bressan et al. | |
| 2009/0061974 A1* | 3/2009 | Lutnick et al. | 463/13 |
| 2009/0063206 A1* | 3/2009 | Payne et al. | 705/5 |
| 2009/0144033 A1* | 6/2009 | Liu et al. | 703/2 |
| 2009/0228510 A1* | 9/2009 | Slaney et al. | 707/102 |
| 2009/0265383 A1 | 10/2009 | Sanyal et al. | |
| 2009/0280860 A1* | 11/2009 | Dahlke | 455/556.1 |
| 2010/0022308 A1* | 1/2010 | Hartmann et al. | 463/42 |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |
| 2010/0189354 A1* | 7/2010 | de Campos et al. | 382/190 |
| 2010/0191743 A1 | 7/2010 | Perronnin et al. | |
| 2010/0210358 A1 | 8/2010 | Csurka et al. | |
| 2010/0279799 A1* | 11/2010 | Chapman | 473/409 |
| 2010/0318477 A1 | 12/2010 | Perronnin et al. | |
| 2011/0026831 A1 | 2/2011 | Perronnin et al. | |
| 2011/0040711 A1* | 2/2011 | Perronnin et al. | 706/12 |
| 2011/0052063 A1* | 3/2011 | McAuley et al. | 382/180 |
| 2011/0085739 A1* | 4/2011 | Zhang et al. | 382/218 |
| 2011/0091105 A1 | 4/2011 | Perronnin | |
| 2011/0184950 A1 | 7/2011 | Skaff et al. | |
| 2012/0182427 A1* | 7/2012 | Marshall | 348/159 |
| 2012/0239506 A1* | 9/2012 | Saunders et al. | 705/14.67 |
| 2013/0028508 A1* | 1/2013 | Perronnin et al. | 382/159 |

OTHER PUBLICATIONS

Microsoft Office 2010, View Only Unread Messages, 2010, http://office.microsoft.com/en-us/outlook-help/view-only-unread-messages-HA102085712.aspx.* von Ahn, et al. "Labeling images with a computer game," in *Proc. SIGCHI Conf. on Human Factors in Computing Systems* (Vienna, Austria, Apr. 24-29, 2004), CHI '04, ACM, New York, Ny, 319-326.

von Ahn, et al. "Peekaboom: a game for locating objects in images," in *Proc. SIGCHI Conf. on Human Factors in Computing Systems* (Montreal, Quebec, Canada, Apr. 22-27, 2006) (Grinter, et al., Eds. CHI '06. ACM, New York, NY, 55-64).

Csurka, et al. "Visual Categorization with Bags of Keypoints", ECCV, Workshop on Statistical Learning in Computer Vision, 2004, pgs. 1-16.

Perronnin, et al. "Adapted Vocabularies for Generic Visual Categorization", ECCV 2006, Part IV, LNCS 3954, pp. 464-475.

Perronnin, et al. "Fisher Kernels on Visual Vocabularies for Image Categorization", IEEE CVPR, Jun. 2007, pp. 1-8.

Zheng, et al. "Tour the world: Building a web-scale landmark recognition engine", IEEE 2009, pg. 1-8.

U.S. Appl. No. 13/050,587, filed Mar. 17, 2011, Saunders et al.

U.S. Appl. No. 12/859,898, filed Aug. 20, 2010, Perronnin et al.

U.S. Appl. No. 12/890,789, filed Sep. 27, 2010, Sanchez et al.

Perronnin et al. "Improving the Fisher Kernel for large-scale image classification", ECCV 2010, pp. 1-14.

Jegou, et al. "Improving bag-of-features for Large Scale image search", IJVC, 3 (2010) 316-336.

Perronnin, et al. "Large-scale image categorization with explicit data embedding", CVPR, 2010, pp. 1-8.

Lowe. "Distinctive image features from scale-invariant keypoints", IJVC, Jan. 5, 2004, vol. 60, pgs. 1-28.

Sanchez et al. "High-dimensional signature compression for large-scale image classification", CVPR, 2011, pp. 1-8.

* cited by examiner

PHOTOGRAPH-BASED GAME

BACKGROUND

Aspects of the exemplary embodiment relate to a system and method for playing a game and find particular application in connection with a photograph-based game in which captured images are automatically assessed, based on their compliance with a task provided in the game, using an image analysis method.

Games involving images have been used in a variety of applications. For example, games have been used to address computer vision problems. See, for example, von Ahn, L., and Dabbish, L., "Labeling images with a computer game," in *Proc. SIGCHI Conf. on Human Factors in Computing Systems* (Vienna, Austria, Apr. 24-29, 2004), CHI '04, ACM, New York, N.Y., 319-326, which uses an interactive system for image segmentation. Other games, such as Peekaboom, ESP, and Google Image Labeler have proved useful in the generation of costly ground truth for machine learning and pattern recognition experiments (see, e.g., von Ahn, L., Liu, R., and Blum, M., "Peekaboom: a game for locating objects in images," in *Proc. SIGCHI Conf. on Human Factors in Computing Systems* (Montreal, Quebec, Canada, Apr. 22-27, 2006); and R. Grinter, et al., Eds. CHI '06. ACM, New York, N.Y., pp. 55-64). Other games involve users checking-in to specific places or social networking sites to earn rewards and badges from brands. These games provide no user interaction other than in playing the game.

The exemplary embodiment provides a game which can be played by one or multiple players and which makes use of images submitted by players.

Incorporation by Reference

The following references, the disclosures of which are incorporated herein by reference in their entireties, are mentioned:

The following relate generally to game systems: U.S. Pub. No. 20010049084, published Dec. 6, 2001, entitled INTERACTIVE REWARDS-BASED PEDAGOGICAL SYSTEM USING AN ENGINE OF ARTIFICIAL INTELLIGENCE, by Darryl Joseph Mitry; U.S. Pub. No. 20030069832, published Apr. 10, 2003, entitled METHOD FOR ATTRACTING CUSTOMERS, ON-LINE STORE, ASSEMBLY OF WEB PAGES AND SERVER COMPUTER SYSTEM, by Ralf Czepluch; U.S. Pub. No. 20070243936, published Oct. 18, 2007, entitled INTERACTIVE TOURNAMENT CONTEST, by Bill Binenstock, et al.; U.S. Pub. No. 20070270224, published Nov. 22, 2007, entitled METHOD AND APPARATUS FOR OPERATING A MOBILE GAMING SYSTEM by Eric L. Abbott; U.S. Pub. No. 20080167079, published Jul. 10, 2008, entitled WINNER NOTIFICATION SYSTEM by Brook W. Garrettson, et al. U.S. Pub. No. 20080045339, published Feb. 21, 2008, entitled GAMING SYSTEM HAVING AWARD RECOGNITION, by Chang-Han Lin; U.S. Pub. No. 20090265383, published Oct. 22, 2009, entitled SYSTEM AND METHOD FOR PROVIDING IMAGE LABELING GAME USING CBIR, by Subhajit Sanyal, et al.; U.S. Pub. No. 20100210358, published Aug. 19, 2010, entitled MODIFICATION OF IMAGES FROM A USER'S ALBUM FOR SPOT-THE-DIFFERENCES, by Gabriela Csurka, et al.; U.S. Pat. No. 7,313,276, published Dec. 25, 2007, entitled METHOD AND DEVICE FOR OPERATING AN ELECTRONIC COMMUNICATION NETWORK GAME, by Kim Simelius, et al.

U.S. patent application Ser. No. 13/050,587, filed on Mar. 17, 2011, entitled SYSTEM AND METHOD FOR ADVERTISING USING IMAGE SEARCH AND CLASSIFICATION, by Craig Saunders and Nicolas Guerin, discloses computing the profile of a person base on categorization of images in the person's collection.

BRIEF DESCRIPTION

In one aspect, a method for playing a photograph-based game includes establishing a communication link between a game playing system and at least one game playing device. Each device is operated by a respective player. Game rules are provided for presenting to the player on the game playing device. The game rules including at least one task for the submission of a photographic image. For each of the tasks, the method includes providing for receiving a photographic image in the game playing system which is submitted via the established link from a respective game playing device. An image signature is computed for the submitted photographic image, based on visual features extracted from the image. A relevance to the task is computed, based on the computed image signature. A score for the game for each player is output, based on the computed relevance of the image(s) submitted in response to the one or more tasks.

In another aspect, a game playing system includes memory which stores instructions for presenting game rules to at least one player operating a communicatively-linked associated game playing device. The game rules include at least one task for the submission of at least one photographic image from the game playing device. For each of the at least one tasks, instructions are provided for receiving a photographic image from the game playing device, computing an image signature for the submitted photographic image based on visual features extracted from the image, and computing a relevance to the task, based on the computed image signature. Instructions are provide for outputting a score for the game for the respective player(s) based on the computed relevance and for issuing a reward to one or more of the player(s), based on the score for the game. A processor in communication with the memory executes the instructions.

In another aspect, a computer-implemented method for playing a photograph-based game includes providing instructions for causing a representation of each of a set of categories to be displayed on a game playing device, providing instructions for receiving a player's selection of one of the categories in the set from the game playing device and, for the player's selected category, providing instructions for receiving a photographic image submitted by the game playing device, and providing instructions for computing, with a processor, an image signature for the submitted photographic image based on visual features extracted from the image. Instructions are also provided for computing a relevance to the category, based on the computed image signature and for outputting a score for the game, based on the computed relevance for each of a plurality of the user-selected categories.

DETAILED DESCRIPTION

Figure 1:
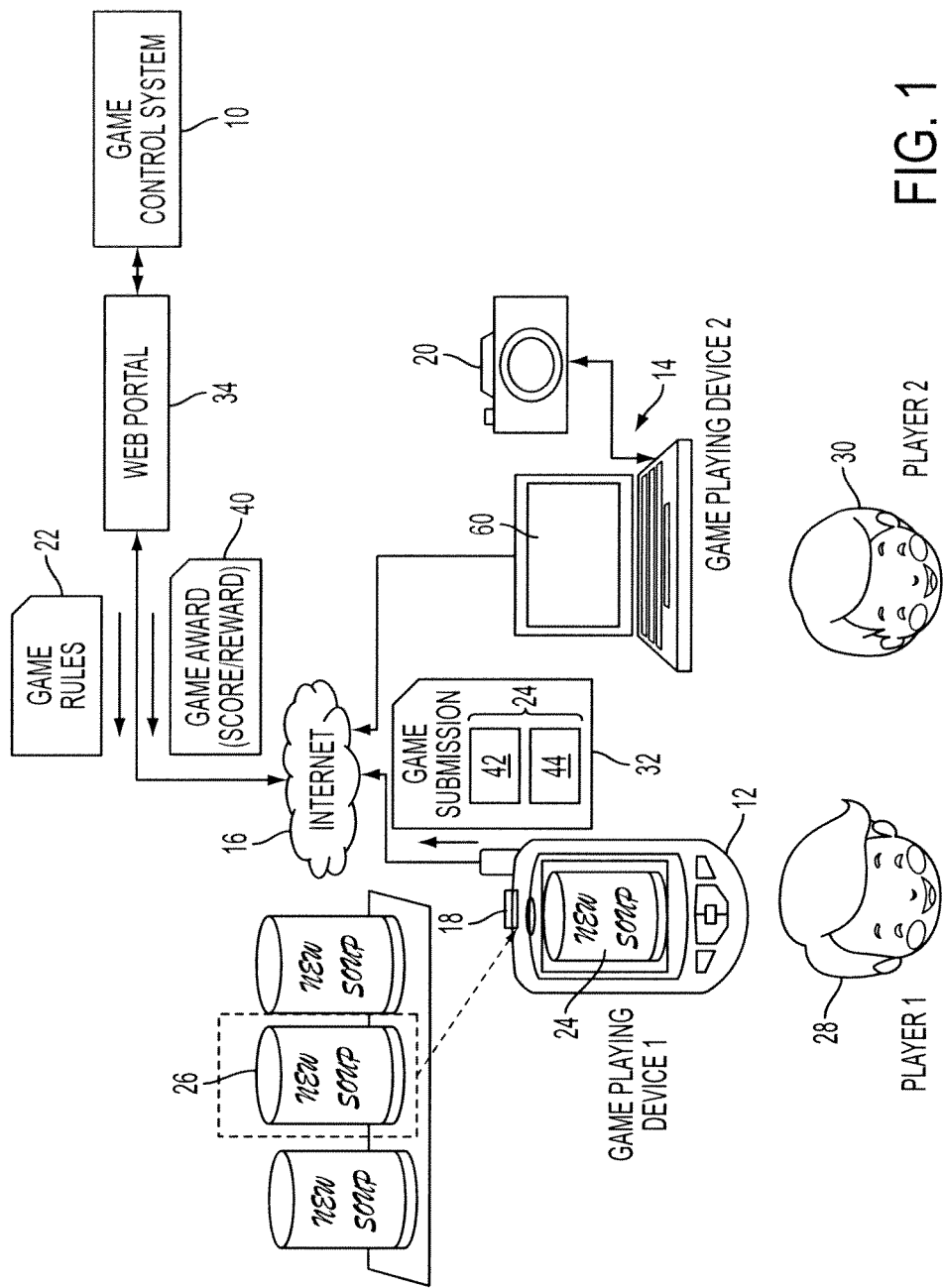
FIG. 1 illustrates components of a game playing apparatus in accordance with one aspect of the exemplary embodiment.

Aspects of the exemplary embodiment relate to a system and method for playing a game and to a computer program product for storing instructions for operating the game. The photography-based game can be developed based on computer vision techniques which enables engagement between one or many companies and a wide range of users.

A participant (or player) can be any person or persons with access to an image acquisition device, such as a digital camera, mobile phone, PDA with built-in camera, or the like, capable of acquiring photographic images.

The exemplary system and method combines the ability of such mobile devices to take images with computer vision techniques, such as image classification and image matching, and a game which allows many scenarios. Te game can be designed to benefit the player (e.g., a consumer or a student), and/or the game organizer, e.g., in the form of revenue or other benefits.

In general a player (or group of players) can be given rules for playing the game including one or more tasks (e.g., in the form of a set of instructions). Progress of the game can then be measured or altered depending on the images the player(s) take and the results of the computer vision algorithms processing those images. The output of the game is an award which may be given in the form of a score or a reward. The system may operate fully automatically. In other embodiments, a game organizer may also be part of the process.

In an exemplary game, players are rewarded for taking photographs of objects, such as specific locations or physical objects. An object can be anything which can be captured with an image capture device, such as a camera. The photographs are automatically analyzed by image classifiers or object recognition systems for relevance. Optionally, human review of a small number of the acquired images may be included, e.g., after automatic classification. The exact nature of the game, final reward for players, and benefits for the creator/executor of the game may depend on the application context Briefly, the mobile photograph-based game can employ some or all of the following components:

1. A portable device capable of taking an image (e.g., mobile phone, pad, laptop) and communicating with another device which contains the ability to process the images (e.g., another mobile device, servers on the internet).

2. A computation process that makes use of one or more computer vision techniques such as image classification, object recognition, or image retrieval to provide a score to each image.

3. Game rules (either fixed, or dependent on single or multiple user activity in the game) which may include one or more tasks involving image capture.

4. A scoring algorithm, where the score for a player may be based on the captured image(s) alone or in combination with other factors. The score of the game (which can serve as incentive for players) can thus depend solely on the feedback of the image analysis. It may also depend on other factors, such as participants in the game or other real-time events.

5. An award system, where the game participant(s) or winner(s) receive awards, such as posted scores or tangible or intangible rewards based on the computed scores.

6. An objective for the game organizer (creator or executor of the game). The objective may be to generate benefits to one or many companies. This may be to raise brand awareness, promote a particular product, change user behavior in real-time, obtain consumer feedback, obtain a product poll or snapshot, generate revenue, or combination thereof. In the case of the player, the objective may be for educational, entertainment, obtaining rewards, or other purposes.

With reference to FIG. 1, an environment in which an exemplary photograph-based game can be played is shown. A game control system 10, which may be implemented in one or more computing devices, communicates with a plurality of computer-implemented game playing devices 12, 14. The game playing devices 12, 14 can each be any device capable of capturing an image, distributing it, and receiving feedback. For example, the game control system 10 communicates with devices 12, 14 via one or more wired or wireless links 16, such as a telephone line, local area network or wide area network, such as the Internet, or a combination thereof. Each of the exemplary game playing devices 12, 14 includes an image capture device 18, 20, such as a camera, incorporated into or associated with it. In the embodiments described below, the game playing devices 12, 14 are mobile phones capable of communicating with a server on the Internet and receiving communications therefrom. However the device could be any capable communication and image capture device, and the communication method may be distributed rather than to a central server (e.g., other mobile devices may contain the image analysis algorithms). Additional features of the portable device (e.g., GPS location, surrounding network visibility, proximity of other devices) may also be used in the game if available.

The exemplary game control system 10 outputs game rules 22 for completing one or more tasks for a current game. The rules 22 are transmitted to one or more of the game playing devices 12, 14 via link(s) 16. The task(s) for each game may include capture of one or more photographic images 24 of a predefined real world object 26 (a can of soup in the illustrated embodiment). Participants 28, 30, operating their respective game playing devices, review the rules and may each capture or otherwise acquire an image 24 which is intended to at least partly satisfy the presented ask. A game submission 32, based on the captured image 24, is generated by an application running on the game playing device 12 and is transmitted via a link 16 to the game control system 10, e.g., via a game playing web portal 34. The game control system 10 receives the game submission 32, which may include one or more captured images 24 or representation(s) thereof, and automatically computes a score, which reflects the responsiveness of the game submission to the task(s), based on the received game submission 32.

In the exemplary embodiment, the game control system 10 employs one or more of:

a) image classification techniques to return category scores for one or more of a finite set of image categories; and b) image matching techniques to compute matching scores between two images.

These two techniques thus compute similarity between the captured image and an individual target image or group of target images, or with a class of target images (using a class model trained on the target images in the class). The game control system 10 outputs a game award 40, such as a game score or a score-based reward to one or more of the participants 28, 30, based on their respective scores. The game output may be transmitted to the participating game playing devices or to an implementing system which provides the reward to the winning participant.

The exemplary digital images 24 are photographic images, such as individual photographic images (photos), video images (videos), and combinations thereof which may be multicolor (color) and/or monochrome (e.g., black and white) images. The images 24 may be stored in any convenient file format, such as JPEG, TIFF, PDF, or the like. Each image includes information including image data 42 for forming an array of pixels which can be used to form an output image when rendered on an output device, such as a display device, printer, or the like. The image data 42 may include colorant values, such as grayscale values, for each of a set of color separations, such as RGB, or be expressed in another other color space in which different colors can be represented. In general, "grayscale" refers to the optical density value of any single color channel, however expressed (RGB, YCbCr, etc.). Digital images may also have associated information 44 in addition to the image data, which may be in the form of metadata, such as that included in exchangeable image file format (EXIF) data in the case of image files from cameras, smartphones and scanners. The associated information 44, may be generated by the image capture device 18, 20 and may include at least one of a time stamp (a record of the day and/or time at which the image was captured) and geo-positional (GPS) information (e.g., which represents the latitude and longitude, to several decimal places, of the respective image capture device 18, 20 at the time of image capture). During processing, a digital image 24 may be cropped, have its pixel resolution changed (e.g., reduced), be color modified, processed to reduce blur or increase sharpness, be converted to another file format, or otherwise processed, the resulting image still being referred to herein as the digital image.

The game playing devices 12, 14 may be mobile devices, such as mobile phones, portable computers, such as laptops, pads, notebooks, palmtop or portable digital assistant (PDA) devices, or the like, or may be dedicated game playing devices equipped with cameras. Any number of game playing devices 12, 14 may participate in the same game at the same time, allowing multiple participants 28, 30, such as two, three, ten or more participants, to compete for the same reward 40. Alternatively, a game may be played by a single participant 28, with the reward serving as an incentive for playing the game.

Figure 2:
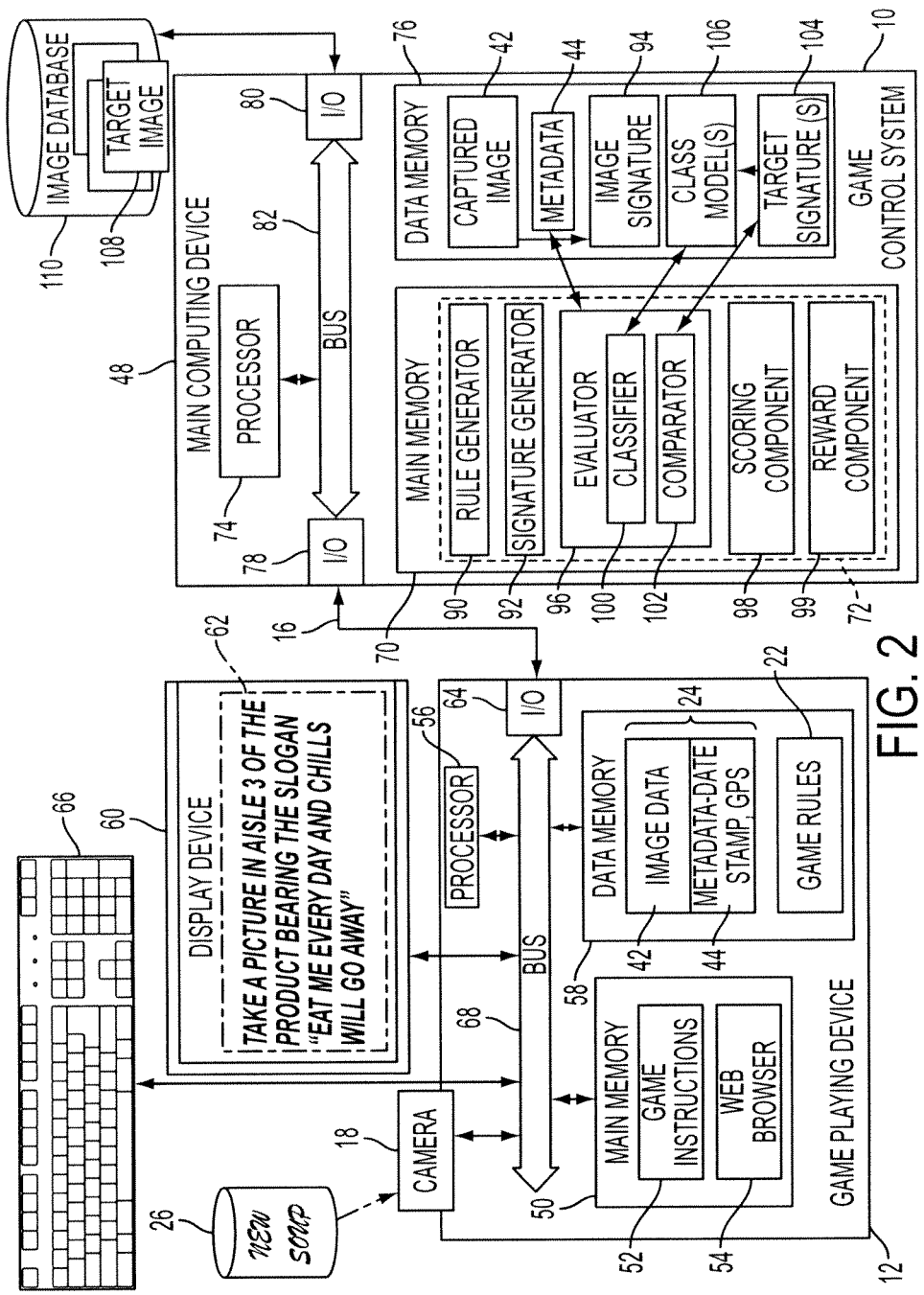
FIG. 2 is a more detailed, functional block diagram of the apparatus of FIG. 1, including a game control system in accordance with one aspect of the exemplary embodiment.

With reference also to FIG. 2, components for playing the game, in accordance with one embodiment, are shown in greater detail. The game control system 10 is hosted by one or more main computing devices 48, such as the illustrated server computer. Each of the game playing devices 12, 14 (only one device 12 is shown by way of example in FIG. 2) is remote from the main computing devices 48 and includes main memory 50 which stores instructions 52 for implementing the game on the game playing device 12. For example, the game playing instructions 52 can be in the form of an application software package downloaded using a web browser 54 on the game playing device, e.g., provided by the game control system 10. The application 52 may implement some of the rules for the game, such as a time limit for image capture, whether a time stamp for the captured image 24 has to postdate the start of a game, operations for image compression, how many images can be submitted for each task, the process for uploading each acquired image 24 to the web portal 34, and so forth.

A processor 56, such as the device's CPU, is in communication with memory 50 and implements the local game playing instructions 52. Processor 56 may also control the operation of the game playing device 12. Data memory 58 stores captured images 24 and game rules 22 for a specific game. An output device 60, such as display device (e.g., an LCD screen or a computer monitor), speakers, or a combination thereof presents a representation 62 of the game rules 24 to the participant 28 in visual and/or audible form. A network interface (I/O) 64, such as a modem, allows the game playing device 12 to communicate with external devices, such as the exemplary main computing device 48 hosting the game control system 10, via communication link 16. A user input device(s) 66, such as a keypad, keyboard, cursor control device, touch screen, or the like, is provided for a participant to input commands to the game playing device processor 56. Hardware components 18, 50, 56, 56, 60, 64, 66 of the game playing device 12 communicate via a data/control bus 68.

Main computing device 48 can be similarly configured to the game playing devices 12, 14, except as noted. The illustrated server computer 48 includes main memory 70, which stores remote instructions 72 for controlling the playing of a game, and a processor 74, such as the computer's CPU, in communication with main memory 70, for executing the instructions 72. Processor 74 may also control the operation of server computer. Data memory 76 stores information for computing the participant's score 40 for the game. The computer 48 communicates with external devices via one or more input/output devices 78, 80. Hardware components 70, 74, 76, 78, 80 of the computer 48 communicate via a data/control bus 82.

As will be appreciated, while the exemplary game is implemented in a plurality of computing devices 12, 48, in some embodiments, all of the instructions 52, 72 may be stored in the game playing device 12 itself, allowing a single player to play the game without a communication link.

In one exemplary embodiment, the instructions 72 include a rule generator 90 which generates and/or outputs the rules 22 for a current game, a signature generator 92 which generates a representation ("a signature") 94 of the captured image 24, based on low level, visual features extracted from the image (e.g., from the image data 42), an evaluator 96, which evaluates the compliance of image 24 with the current task, based on the computed signature 94, a scoring component 98, which computes a participant's score for the game, based on the evaluation of one or more captured images 24 transmitted to the system 10 during the game, and a reward component 99 which provides for a player to receive a predetermined award or to select one of a set of rewards.

The exemplary evaluator 96 includes a classifier 100 and/or a comparator 102 which take(s) as input the image signature 94 and outputs a determination of the image's similarity to one or more target image signatures 104. The comparison may be performed directly, in the case of the comparator 102, or by using a class model (or models) 106 trained on the target image signatures 104, in the case of the classifier 100. The target signature(s) 104 may each be extracted from a respective target photographic image 108, i.e., an image which may have been provided as being representative of what the captured image should contain. Sets of target images 108, or their signatures, may be stored in an associated database 110 in memory accessible to the system 10, such as local memory 76 or remote memory. In one embodiment the class models 106 may have been pretrained on the target image signatures 104 and thus it is not necessary to store the images 108, or their signatures 104, in memory. In some embodiments, the target images 108 may include images provided by other players, e.g., in the same game or previous games.

In one embodiment, the classifier 100 is trained to assign a predefined one (or more) of a predefined set of categories to the captured image based on its signature. The classifier 100 inputs the signature to each of a pretrained set of binary class models 108 or to a single multi-class classifier model. An exemplary categorizer of this type which may be used herein is the Xerox Generic Visual Classifier (GVC) as described, for example, in U.S. Pub. Nos. 2007/0005356, 2007/0258648, and 2008/0069456, the disclosures of which are incorporated herein by reference in their entireties.

In one embodiment, to provide the training data for the classifier models, the system 10 may crawl the database 110 to find a subset of images 106 in the database which have each been tagged with a category (or categories) of interest for the game. These serve as positive examples, with negative samples optionally being drawn randomly from the rest of the database 110. In another embodiment, the labeled training samples for each class may be manually selected, e.g., by the game operator, who may also provide the negative samples. As an example, images 108 of the game operator's product serve as positive samples and images of competitor products serve as the negative samples.

The evaluator 96 may also receive as input the metadata 44 for the captured image, which may be used to determine whether the captured image 24 satisfies one or more game rules. For example, the rules may establish a time window (start time and/or end time) for the capture of the image 24, which may be verified through examination of the image's time stamp. In some embodiments, a participant operating on the device 12 may also be permitted to submit images 24 that are displayed on the participant's personal web page on a social network site or which are stored in memory of the game playing device 12 or which are accessible thereto which have been acquired at some time before the task is issued, e.g., which have a data stamp before the task is presented. In some embodiments, the rules may establish a geographical region within which the captured image 24 is to be acquired, which can be verified through examination of the GPS coordinates of the captured image.

The digital processors 56, 74 can each be variously embodied, such as by a single-core processor, a dual-core processor (or more generally by a multiple-core processor), a digital processor and cooperating math coprocessor, a digital controller, or the like. In general, any device, capable of implementing a finite state machine that is in turn capable of implementing the flowchart shown in FIG. 3, can be used as the processor. The memory or memories 50, 58 (and similarly memories 70, 76) may represent any type of non-transitory computer readable medium such as random access memory (RAM), read only memory (ROM), magnetic disk or tape, optical disk, flash memory, or holographic memory. In one embodiment, the memory 50, 58 (and similarly memory 70, 76) comprises a combination of random access memory and read only memory. Exemplary memory 50, 58, 70, 76 stores instructions for performing the exemplary method and data used and generated therein, which may be transferred or shared between memories, as described in greater detail below. The exemplary arrangement of computing devices is intended to be illustrative only.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
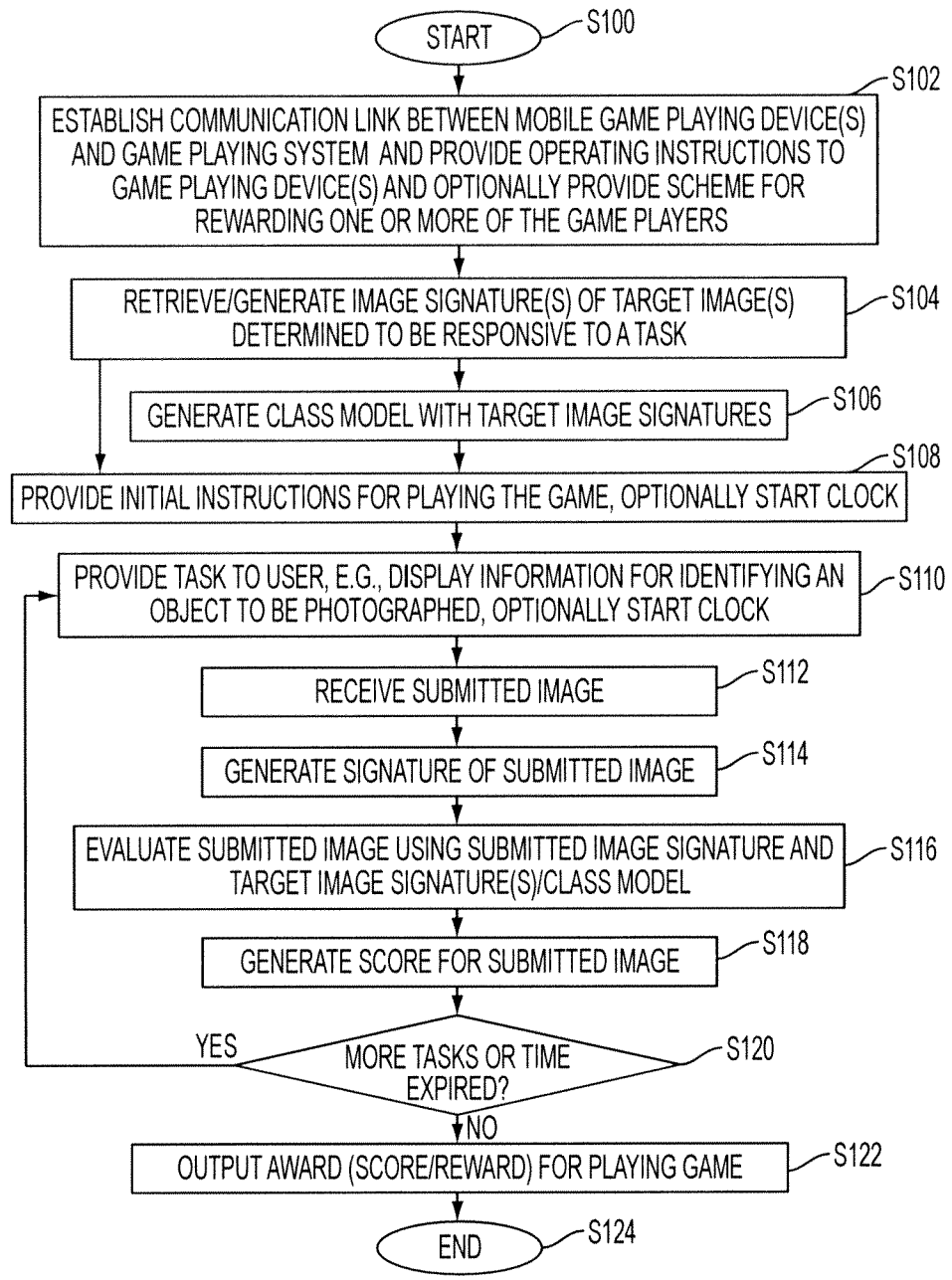
FIG. 3 is a flow chart illustrating a game playing method in accordance with one aspect of the exemplary embodiment.

With reference also to FIG. 3, a flow chart illustrating a computer implemented method for playing the game is shown. In the exemplary embodiment, the participant's objective is to accumulate points by submitting an image 24 of an object 26 which is responsive to a task 62 displayed on the display device. The game can be played in single mode (against the computer 48) or against one or more other participants in real time. The method begins at S100 and may proceed as follows.

At S102, prior to playing a game, communication links may be established. For example, a web portal is provided for receiving images 24 (e.g., as an automatically generated and uploaded game submission 32) uploaded by participant devices 12, 14 and for transmitting game rules 22 and game operating instructions 52 to the participant devices.

At S104, the evaluator may be provided with comparison data. In particular, the system 10 may retrieve or generate image signature(s) 104 for at least one target image 108 which is/are determined to be responsive to a task to be presented to the player(s). The image(s) 108 may be provided by a game organizer (e.g., photographs of the game organizer's product(s)) or by an automated retrieval method (e.g., by inputting a keyword search and retrieving images from the database 110 which are labeled with the keyword).

In one embodiment, at S106, a class model 106 is trained on the set of retrieved/generated target image signatures 104. In some embodiments, the class model(s) may have been previously trained, for each of a set of categories (classes) on labels assigned to target image signatures for a training set of images 108. As will be appreciated, steps S104 and S106 may be performed at any time prior to S116, such as prior to S102.

Rules of the game may be provided in one or more stages. For example, at S108, the player(s) may be provided with initial instructions for playing the current game, such as how many images are to be submitted during the course of the game, the time limit for submission of each image 24, and any scoring protocol, rules for playing against another person, and the like. In some embodiments, players may be required to pay for playing the game. Then subsequently, at S110, a (first or subsequent) task is caused, by the system, to be presented to the player(s), e.g., to be displayed on the display device 60. The task generally includes information 62 for identifying the object 26 (or a next object) to be photographed, such as a category for the object, a description or a clue as to the nature of the object, a location where the object may be found, combination thereof, or the like. For example, players in a zoo could be asked, as one task, to photograph a tiger, or to photograph something which has paws and stripes.

The player reads the information 62 and captures or otherwise acquires an image 24 which is intended to be responsive to the task 62. At S112, the application 52 running on the mobile device 12 uploads the captured image 24 to the system 10 and the game submission 32 is thereafter received by the system 10.

At S114, the signature generator 92 generates a signature 94 which is representative of the acquired image 24 which has been submitted at S112. In other embodiments, the signature may be generated by a signature generator analogous to generator 92, but located on or otherwise accessible to the game playing device 12 and which is uploaded to the system 10 in submission 32.

At S116, the acquired image 24 is evaluated, e.g., by evaluator 96, to determine its relevance to the task. This may include computing a similarity of the computed signature 94 with the target image signature(s) 104, either directly in the case of the comparator 102, or through use of the model(s) 106 generated at S108. Other computer vision techniques may alternatively or additionally be employed for computing relevance, such as object recognition.

At S118, a score may be computed for the captured image, based on the relevance computed at S116. The current task score may be output by the system 10 and visualized on the mobile device 12, 14.

At S120, if there are more tasks to be completed during the game, the method returns to S110, otherwise, to S122. In some embodiments, the next task provided at S110 may be a function of the player(s) score(s) for the currently task. For example, the game may be made harder/easier if all players score high/low. Or, if the game is used in a learning environment and if players do not capture a correct image 24 (e.g., as determined by the evaluator score), then at S120, the game may automatically provide more information, such as clues, and repeat the same task.

In some embodiments, the system starts a clock when the game starts and/or when a task is displayed (e.g., at S108 or S110) and if no captured image is received within a predetermined time period or no received captured image is deemed to be relevant at 5116, then at S112, the method automatically proceeds to S110 (in the case of a task time limit) or to S122 (in the case of an overall game time limit).

At S122, the score for the game is output, based on the score(s) computed at S118. In some embodiments, a reward is offered for the game which is based on the score(s) of one or multiple players.

The method ends at S124.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the exemplary method.

Further details of the system and method are now provided.

Generation of Image Signatures

The captured image 24 and target images 108 are each represented by a signature 94, such as a multidimensional vector, graph, or the like, which is a statistical representation of visual features extracted from the image. For example, any of the methods disclosed in the following references, the disclosures of which are incorporated herein by reference in their entireties, can be used for generating an image signature 94, based on content: U.S. Pub. Nos. 20030021481; 20070053356; 20070258648; 20080069456; 20080240572; 20080317358; 20090144033; 20100040285; 20100092084; 20100098343; 20100191743; 20100189354; 20100318477; 20110040711; 20110026831; 20110052063; 20110091105; U.S. application Ser. No. 12/693,795, filed on Jan. 26, 2010, entitled A SYSTEM FOR CREATIVE IMAGE NAVIGATION AND EXPLORATION, by Sandra Skaff, et al.; U.S. application Ser. No. 12/859,898, filed on Aug. 20, 2010, entitled LARGE SCALE IMAGE CLASSIFICATION, by Florent Perronnin, et al.; U.S. application Ser. No. 12/890,789, filed on Sep. 27 2010, entitled IMAGE CLASSIFICATION EMPLOYING IMAGE VECTORS COMPRESSED USING VECTOR QUANTIZATION, by Jorge Sánchez, et al., Gabriela Csurka, et al., "Visual Categorization with Bags of Keypoints," *European Conf. on Computer Vision* (ECCV) *Workshop on Statistical Learning in Computer Vision* (2004); Perronnin, F., Dance, C., Csurka, G., and Bressan, M., "Adapted Vocabularies for Generic Visual Categorization," in ECCV 2006; Florent Perronnin, et al., Perronnin, F., Dance, C., "Fisher Kernels on Visual Vocabularies for Image Categorization," in Proc. IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference (2009); Herve Jegou, Matthijs Douze, and Cordelia Schmid, "Improving Bag-Of-Features for Large Scale Image Search," in IJCV, 2010; F. Perronnin, J. Sánchez, and T. Mensink, "Improving the Fisher kernel for large-scale image classification," in ECCV 2010; Florent Perronnin, et al., "Large-scale image categorization with explicit data embedding," in CVPR 2010; and Jorge Sánchez and Florent Perronnin, "High-dimensional signature compression for large-scale image classification," in CVPR 2011.

Fisher vectors, Fisher Kernel representations, and Bag-of-Visual-Word representations are exemplary of such types of high-level statistical representation which can be used herein as image signatures 94.

For example, the signature generator 92 includes a patch extractor, which extracts and analyzes visual features of patches of the image 24, 108, such as shape, texture, or color features, or the like. The patches can be obtained by image segmentation, by applying specific interest point detectors, by considering a regular grid, or simply by random sampling of image patches. The extracted low level features (such as vectors) from each patch can be concatenated and optionally reduced in dimensionality, to form a features vector which serves as the image signature. In other approaches, the feature vectors of the patches of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the patch vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc.), or the like. Given a new image 24, 108 to be assigned a signature 94, each extracted feature vector is assigned to its closest visual word in the previously trained vocabulary or to all visual words in a probabilistic manner in the case of a stochastic model. A histogram is computed by accumulating the occurrences of each visual word. The histogram can serve as the image signature 94 or input to a generative model which outputs an image signature 94 based thereon.

For example, as the patch feature vectors, local descriptors extracted from the patches, such as SIFT descriptors or other gradient-based feature descriptors can be extracted. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-D SIFT descriptors. Other suitable local descriptors which can be extracted include simple 96-D color features in which a patch is subdivided into 4×4 sub-regions and in each sub-region the mean and standard deviation are computed for the three channels (R, G and B). These are merely illustrative examples, and additional and/or other features can be used. The number of features is optionally reduced, e.g., to 64 dimensions, using Principal Component Analysis (PCA).

In the exemplary embodiment, an image vector is computed for each image, and/or for each of a plurality of regions of the image (e.g., three regions, top, middle and bottom), based on the extracted local descriptors of that image (or image region). Partitioning the image into regions retains spatial location information in the image, for example, faces and sky are typically found in the top portion of an image, and thus may be useful for some or all tasks.

In some illustrative examples, a Fisher vector is computed for the image (or each of a set of two or more regions of the image) by modeling the extracted local descriptors of the image/region using a mixture model to generate a corresponding image/region vector having vector elements that are indicative of parameters of mixture model components of the mixture model representing the extracted local descriptors of the image region. The exemplary mixture model is a Gaussian mixture model (GMM) comprising set of Gaussian functions (Gaussians) to which weights are assigned in the parameter training. Each Gaussian is represented by its mean vector, and covariance matrix. It is assumed that the covariance matrices are diagonal. See, e.g., Perronnin et al., "Fisher kernels on visual vocabularies for image categorization" in CVPR (2007). Where Fisher vectors are computed for image regions, these can be concatenated to form the final image vector representing the image. Methods for computing Fisher vectors are more fully described in above-mentioned application Ser. No. 12/890,789 and CVPR 2011 to Sánchez, et al. (hereinafter, collectively referred to as Sánchez). The trained GMM is intended to describe the content of any image within a range of interest (for example, any color photograph if the range of interest is color photographs).

The image signature (vector) representing the image 24 is substantially more compact than the image 24 itself, where compactness or size is measured by the amount of memory or storage occupied by the image vector or image. However, the image vector can still be relatively large. By way of example, in some suitable embodiments: the GMM includes 256 Gaussian components; the descriptors have dimensionality D=64; and partitioning is optionally employed with the number of image regions being R=4.

If the Fisher vector of includes gradients computed for each Gaussian mean $\mu_i$ and for each Gaussian covariance $\sigma_i$, but not for each Gaussian weight $\omega_i$, then the number of gradients P computed per Gaussian component is P=2D=128 gradients. In this case the Fisher vector has dimensionality E=N×P× R=256×128×4=131,072 dimensions. If four-byte floating point arithmetic is used to represent the dimensions, then the Fisher vector for the single image occupies about 0.5 megabyte. A dimensionality reduction method such as PCA can be used to reduce dimensionality of the vector. Compressing the image vectors in this way does not always result in retention of the most useful information. A vector quantization algorithm as disclosed in Sánchez can alternatively be used to reduce the information stored. In this approach, a set of standard vectors in the vector space is defined and a given image vector is compressed by (1) identifying the closest standard vector and (2) representing the image vector by a short "codeword" representing that closest standard vector. A "codebook" provides the associations between the codes and the corresponding standard vectors. Training of class models 106 on such compressed vectors 104 can be performed as described in Sánchez.

Classifier Training (S106)

The exemplary classifier 100 employs one or more classifier models 106, such as one or more binary classifiers, which has/have been trained on a training set of target image signatures and their labels (supervised learning). Here, the training set may include a first set of signatures 104, which are assigned positive labels, and a second set of image signatures, e.g., randomly drawn from the database 110, as the negatively labeled signatures. Typically, each class model 108 has adjustable parameters whose values are determined by training on the labeled training set. The objective of the training is to select the adjustable parameters such that the output of the classifier substantially agrees with the classification labels assigned to the training set signatures. The exemplary classifier model(s) 106 may be linear or nonlinear, and use any suitable classification training algorithm, such as sparse logistic regression, naïve Bayes, linear discriminant analysis, support vector machines, linear regression, or any other suitable machine learning method. The trained classifier models 106 are able to assign a score based on how well an image signature 94 matches the model.

An exemplary algorithm which is suited to this task uses the image features and classification technique described in Sánchez. The trained class models 108 are then used by the image classifier 100 (at S116) to evaluate the submitted image 24.

Computing Relevance (S116)

This computation process makes use of the above-mentioned computer vision techniques such as image classification, object recognition, and/or image retrieval, to generate a relevance score. In all cases, the scores can be used in order to compute feedback to the user (to give them a score or reward), or stored in system memory 76, e.g., to determine current status, or to give real-time feedback to users on the next step in the game, such as providing the next task.

1. Comparator

In one embodiment, the exemplary evaluator 96 includes a comparator 102 for comparing the captured image 24 and one or more target images 108. The similarity of two images (captured image 24 and target image 108) can be defined as a distance between their respective image signatures 94. Several suitable measures of similarity/distance between histograms including the dot product, the $chi^2$ distance, the Kullback-Leibler (KL) divergence, the Jensen-Shannon divergence, and the like may be used in computing similarity between the signatures. In the case of the Fisher Kernel as a signature, measures such as the Euclidian distance, the Manhattan distance, or the cosine similarity may be used in computing similarity between image signatures.

2. Classifier

In another embodiment, the exemplary evaluator 96 includes an image classifier 100 which may be trained on several categories (e.g., cars, mountains, beaches, landmarks, such as the Eiffel Tower, etc.) and be able to return a score for each of these categories for any image 24 submitted. The trained classifier(s) receives the signature 94 of the captured image 24 and outputs a classification based on the signature. The classification may be hard (e.g., "1" if the object is assigned to the class or "0" otherwise), or can be soft (e.g., the classification output is a value between 0 and 1 inclusive with higher values indicating a higher likelihood of membership in the class). A soft classification can be converted to a hard classification by thresholding.

For example, the class models 108 trained at S106 are used by the image classifier 100 to assign a captured image 24 to one or a subset (less than all) of the classes, or assign it probabilistically over all classes, based on its computed image signature. For example, the trained class models may each assign a score based on how well an image signature of the retrieved image matches the model. The classifier 100 may assign the category with the highest score to the image or use information, in addition to the class scores, such as GPS information, in computing the most probable category.

The classes used may be broad classes, such as "car," "boat," or the like. In some embodiments, a more refined classification or object detection algorithm may be used to determine relevance, such as: does the picture contain a certain logo, or a certain model of car.

Image matching techniques may also be employed by the evaluator to compute a similarity score to either other player's images or to target reference images 108.

The image evaluation at S116 (e.g., similarity output by comparator 102 or classifier 100 score(s)) may be used to provide a relevance score for the image at S118. In some embodiments, other image processing and/or methods for scoring may be employed in addition to or in place of the visual information output at S116. For example, returning a score based on the quality of an image (either via a computational method or by asking users to score the image), image popularity, landmark popularity, number of similar images already submitted, and the like also are contemplated.

In some embodiments, other sources of information, such as the GPS location and/or time stamp of the image 26 are also used in computing the relevance score. For example, if the GPS location indicated that the image capture device 12 was within a predetermined distance, such as within a radius of 100 meters, of the known location of the object 26, then this may be a factor in the score.

In some embodiments a two (or more) stage evaluation may be performed. For example, if the task is to identify a car of a particular make or model, a first, generic classification step may be performed to determine whether the image is likely to be of a car. The area of the image corresponding to the car may then be extracted (e.g., using the method of U.S. Pub. No. 20110052063) and a further classification applied to all or a predetermined portion of the extracted region, for example, to identify whether the extracted region includes a particular logo, e.g., by comparing an extracted region to a logo of interest. If the task specifies chromatic information, such as "a blue car," color information may be used to screen the images.

The output of S118 may be a relevance score for the captured image 24 based solely or partly on the image evaluation at S116, which may be presented to the player on the mobile device 12. For example, if the classifier indicated that the image matches a preselected category, the player is awarded one or more points or simply given an indication as to whether the task as been completed correctly, such as "right" or "wrong."

In some embodiments, the player may be permitted to submit another image if the current task has not been correctly completed within the preset time limit or, in a multiplayer game, if no player has completed the current task correctly, in which case the method returns to S112. In other embodiments, the next task is automatically presented (S110), if there is one, otherwise the method proceeds to S122.

Scoring and Rewards for Players (S122)

The score for the game depends on the relevance scores output at S118 for the submitted image(s). It may also depend on other players in the game or other real-time events. The exact nature of the game, final reward for players and benefits for the game organizer may depend on the application context.

The scoring component 98 may include a scoring algorithm which evaluates the image(s) based on one or more factors, such as relevance to a particular category, computed aesthetics, number of images, user components (user score or popularity, based on comments submitted by others), other real time events (other players in the game, external events to the game). In other embodiments, the score may be based solely on the output of the evaluator 96. Where the game includes multiple players, a winner of the game may be identified based on the score.

The reward component 99 may permit the game winner/player to obtain one or more social rewards (such as a score, position on a leader board, or a badge) and/or one or more concrete rewards (such as rebates, coupons, or gifts) as the reward 40.

Example Games

By way of example, the following games are contemplated. In each of the games, the game may have a time limit, may depend on interactions between users, or just be a single user game, and intermediate scores or rewards may be given to the user at any time.

1. Single-User Games Related to Commercial Products

In one embodiment, players are simply asked to take pictures containing a particular product or group of products. Examples of tasks for step S110 could be very simple such as:

Take a picture of a can of this particular type of soft drink

Take a picture where the main element is this trademark

Take a series of pictures of cars of make X, where each one is a different model, or different color, etc.

Rewards for the player in this game could be social rewards (e.g., score, leaderboard position) for most pictures, fastest time, and the like. Players could be given a product benefit (e.g., discount coupon, free drink, test drive new model of car for first 10 people to complete the game), or the like.

Benefits to the game organizer may include some or all of the following:

An increase in brand awareness, since the player is actively looking for products. Brand recognition values could be computed (e.g., if players are submitting many images of a close but incorrect brand, this is an indicator that there is brand confusion).

Longer-time games could generate a social media buzz. For example, some rare items could be hidden with clues given on a social networking site(s), such as the Facebook™ site.

Various polls may be taken.

Users participating in a 'take images of this model of car' within a timeframe would give manufacturers information with respect to model popularity, color, etc. If photos contain GPS information, this could provide extra local information. A census of this type of image could provide valuable information not easily available elsewhere (e.g., a car manufacturer asks for pictures of a certain model of car not released for 10 years, which may give information on how many cars are currently still in use). Combinations of pictures could be used as a proxy for GPS when this information is not available (e.g., the task could require the player to photograph car X in front of a famous monument).

A combination of products could be asked for in order to determine partnerships (e.g., a photo of our product Y and competitors/different product Z in the same image).

2. Multiple-User Games for Branding

These may include variants of games where users have to compete or collaborate to achieve a goal as distinct from the single user games above. Reward mechanisms may be similar, however, game organizers are able to gather information over a wider area or increase coverage. In this setting, players may be asked to take a picture most similar to another image (this request could be updated in real time), or to take pictures in some order (e.g., the game has 100 pictures of product X, now find product Y). A website may be constructed which allows players that are not currently operating a mobile device to participate in the game (e.g., by seeing their score, obtaining new rules, or guiding others). This may promote prolonged interaction with a desired brand.

3. List of Images

Players may be given a list of images to take, in order to gain some specific reward. There may be a competitive element, or the game could simply ensure a player has gone through certain steps.

Potential applications of the game and benefits may include one or more of:

Visitor diploma. Photographing a set of famous landmarks (e.g., famous monuments) in a city may lead to a reward (e.g., discount coupons, or unlocking an additional game). This would allow city planners to obtain information on popular landmarks, transportation (e.g., based on the order in which images are taken), adequacy of local direction signs, and the like.

Photographing specific items. This could be used in a teaching scenario (e.g., photograph these animals: cat, dog, lion, etc.), or during orientation (to assist people finding their way round a complex site, etc.).

Assist in footflow control. Images given as part of the game could be used to direct players to specific locations. For example, as part of a crowd/line control system in a theme park, images of rides that do not have long queues could be given in order to ensure a balanced distribution of visitors.

Provide interest to users of a social network site.

In any of the games, targeted advertising maybe provided to the user, e.g., as a pop-up, banner, or the like. The advertizing may used the captured images themselves or use a manufacturer's image selected based on the captured image. See, for example, above-mentioned application Ser. No. 13/050,587 for these and other methods of targeted advertizing.

Example Game Prototype

In an example prototype, users of a social network site, such as Facebook, are presented with a game which involves capturing images in predefined object categories. For example a set of ten or more object categories, such as Activity (e.g., dancing, skiing) Aerial, Animal (or type of animal), Baby, Building, Black & White, Boat, Cars, Cartoon, Coastline, Concert, Cycling, etc.), Logo, Person, Product, Scenery (e.g., mountains, lakes, beaches), Sporting event (e.g., football match), Weather (e.g., rain, rainbow, snow, etc.) are provided. The set of semantic labels available to the categorization service may of course depend on the game's context. The images used to learn the class models for these categories may be user images posted on the social networking site or other images. One implementation is based on a client-server architecture, as described above. On the server side, an image categorization service (e.g., the Xerox GVC described above) is able to assign one or multiple semantic labels (from a predefined set of labels) to an image, by analyzing its content. The interface with such a service can be a REST service where image data is uploaded via a multipart HTTP post request and resulting labels are returned in JSON/XML format or an SOAP web service. On the client device (game playing device), a mobile application has access to image capture and network facilities.

Figure 4:
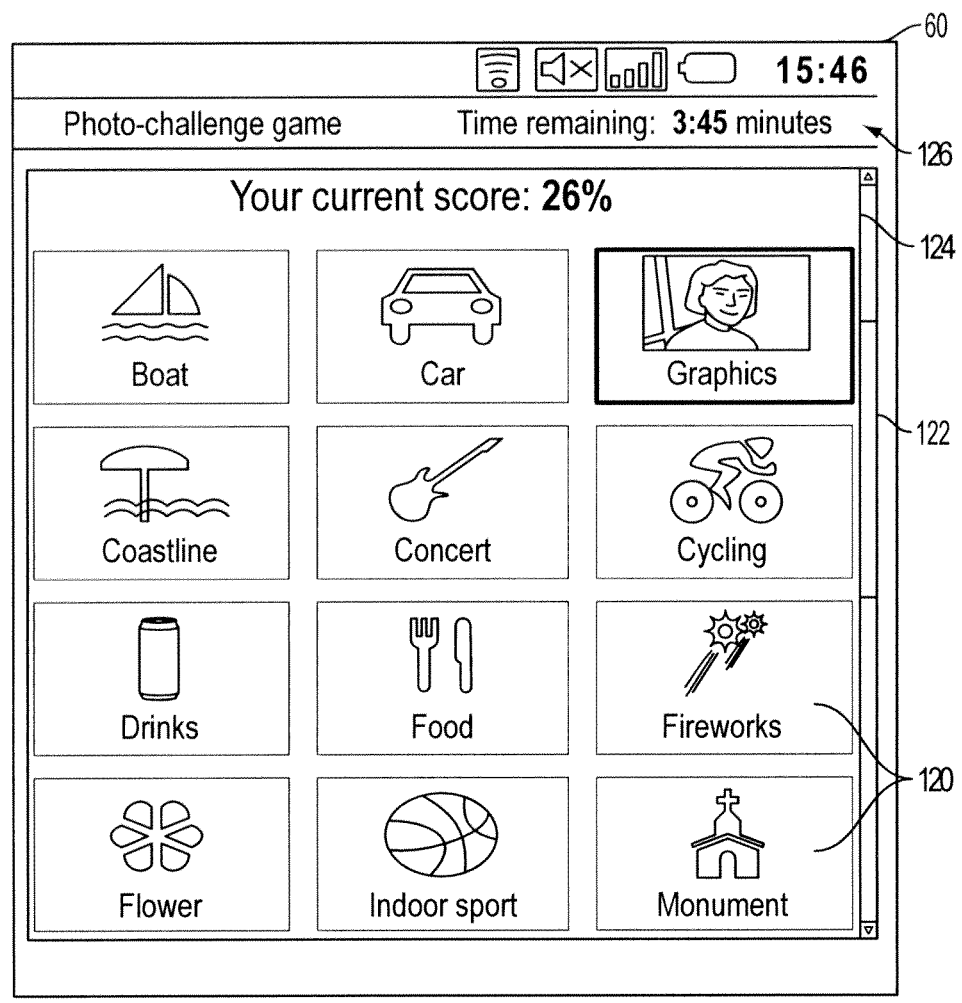
FIG. 4 is a screenshot of an exemplary game playing device during presenting categories in accordance with one aspect of the exemplary embodiment.

FIG. 4 shows a graphical user interface which may be presented on the display of the device 12, 14. The interface displays representations 120 of each of a predefined set of categories, each representation including a word or phrase (e.g., "boat") and an associated graphic (e.g., a drawing of a boat). In the case of a touch screen device, the user may touch the screen 60 for a selected category. In other embodiments, the user may use up/down arrows etc. on a keypad to select the category. The selected category is highlighted, as shown for the "graphics" category. A scrolling tool 122 may be provided when there are too many categories to be displayed easily on the screen. In other embodiments, the system may choose the next category. A score for the game may be displayed, as at 124. This may be a current score, reflecting the images presented to date, or a final score for the game, when complete. A time remaining to play the game may be displayed, as shown at 126.

The goal of one exemplary game is to trigger as many of the categories as possible, within the time frame, with pictures taken with the camera device 18. The player may choose among the list of categories the one that he wants to trigger, and then capture a photo that corresponds to this label. The application 52 then transfers the image data automatically to the server 48 (without any need or ability for the user to perform uploading) and displays whether the photo 24 has triggered the chosen label. The client application enables the player to browse the full set of categories (labels) that are known by the categorization server 100 (in this embodiment, the software 100, 106 for the categorization may be stored on a remote server and the categorization is provided as a service to the system 10). The core image analysis may be performed by the server 48. In some embodiments, the mobile client device 12, 14 may apply some pre-processing operations to fasten the transfer of image data, such as sub-sampling and compression.

Assuming that steps S102-S108 have been already performed, the example game may thus includes the following steps:

1. Providing for the player to pick one category label that has not been triggered yet (S110).
2. When the player captures a photograph with the mobile device's camera (or, in one embodiment, optionally selecting an existing one from the device's photo album), uploading the image to the server and evaluating relevance to selected category (S112, S114, S116). In one embodiment, the application 52 running on the mobile device may require that the image be captured by the device's camera only after the player's selection of the category (i.e., ensuring that it is not an existing image).

3. Computing, and optionally visualizing, categorization results with respect to the previously selected category label (S118).
4. Optionally, visualizing a current score 124, based on the number of successful captured images (S122).
5. The method returns to step 1 (S110) for the next category, until the game ends, e.g., no categories remain, the player has played a predetermined number of iterations, the clock stops, or the player decides to stop play, when another player has received the maximum score (in a multiplayer game), or the game otherwise ends, as provided by the game rules.
6. The final score and/or reward for the player may be presented.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for playing a photograph-based game comprising:
    establishing a communication link between a game playing system and at least one game playing device which is operated by a player;
    providing for presenting of game rules to the player on the at least one game playing device, the game rules including a plurality of tasks for the submission of at least one photographic image that is relevant to a category, the tasks being presented sequentially;
    for each of the tasks:
        providing for receiving a photographic image in the game playing system submitted via the established link from the game playing device;
        computing an image signature for the submitted photographic image, the image signature comprising a multidimensional vector or graph which is a statistical representation of visual features extracted from patches of the photographic image; and
        computing a relevance to the task, based on the computed image signature, the computing of the relevance to the task comprising classifying the image signature with a pretrained classifier model that has been trained on a training set of image signatures and respective labels, the training set of image signatures including image signatures computed for images that are labeled as relevant to the category; and
    presenting a score to the player based on the computed relevance for the task before presenting a next of the tasks.

2. The method of claim 1, wherein the communication link comprises a wireless link.

3. The method of claim 1, wherein the presenting of game rules to the player comprises displaying a task on a screen of the game playing device.

4. The method of claim 1, wherein the presenting of game rules comprises presenting a set of categories from which the player selects one of the presented categories as the task.

5. The method of claim 1, wherein the presenting of game rules comprises presenting information for identifying an object to be photographed as the task.

6. The method of claim 5, wherein the object comprises at least one of a product, a geographical location, a building, a type of animal, a logo, a person, a sporting event, and combinations thereof.

7. The method of claim 1, wherein the game rules require the submitted photographic image to have a date stamp which is later in time than a time at which a respective one of the tasks is provided.

8. The method of claim 1, wherein the submitted photographic image is an image which has been captured by the game playing device.

9. The method of claim 1, wherein the game playing device includes a camera.

10. The method of claim 9, wherein the rules include rules for capturing the photographic image with the camera.

11. The method of claim 1, further providing for a reward to be provided to one of the game players, based on the score for the game.

12. The method of claim 1, wherein the at least one game playing device comprises a plurality of game playing devices, each operated by a respective player, and the output score for the game is based on the computed relevance of images submitted by the plurality of players.

13. The method of claim 1, wherein the at least one game playing device comprises a mobile device.

14. The method of claim 1, wherein the computing of the relevance to the task comprises computing a similarity of the image signature to an image signature for each of at least one comparison image.

15. A computer program product comprising a non-transitory computer readable medium which stores instructions, which when executed by a computer, perform a method for playing a photograph-based game comprising:
    establishing a communication link between a game playing system and at least one game playing device which is operated by a player;
    providing for presenting of game rules to the player on the at least one game playing device, the game rules including a plurality of tasks for the submission of at least one photographic image that is relevant to a category, the tasks being presented sequentially;
    for each of the tasks:
        providing for receiving a photographic image in the game playing system submitted via the established link from the game playing device;
        computing an image signature for the submitted photographic image based on visual features extracted from the image, the computing of the image signature comprising modeling local descriptors extracted from the image using a mixture model to generate a corresponding image vector having vector elements that are indicative of parameters of mixture model components of the mixture model representing the extracted local descriptors of the image; and
        computing a relevance to the task, based on the computed image signature, comprising classifying the computed image signature with a pretrained classifier model that has been trained on a training set of image signatures and respective labels, the training set of image signatures including image signatures computed for images that are labeled as relevant to the category; and
    presenting a score to the player based on the computed relevance for the task before presenting a next of the tasks.

16. A game playing system comprising:
memory which stores instructions for:
- presenting of game rules to at least one player operating a communicatively-linked associated game playing device, the game rules including tasks presented sequentially for the submission of photographic images from the game playing device;
- for each of the tasks:
  - providing for the player to pick one category label from a set of category labels that has not been triggered yet;
  - providing for receiving a photographic image from the game playing device;
  - providing for computing an image signature for the submitted photographic image the image signature being in the form of a feature vector which is based on visual features extracted from the image; and
  - providing for computing a relevance to the task, based on the computed image signature and the category, the computing of the relevance to the task comprising classifying the computed image signature with a pretrained classifier model that has been trained on a training set of image signatures and respective labels, the training set of image signatures including image signatures computed for images that are labeled as relevant to the category;
- providing for presenting a score to the player based on the computed relevance for the task before presenting a next of the tasks and outputting a score for the game for the player based on the computed relevance; and
- providing for issuing a reward to at least one of the at least one player, based on the score for the game; and a processor in communication with the memory for executing the instructions.

17. The system of claim 16, further comprising a plurality of the game playing devices.

18. The system of claim 17, wherein the game playing devices are mobile devices.

19. A computer-implemented method for playing a photograph-based game comprising:
- providing for presenting of game rules to a player on a game playing device, the game rules including a plurality of tasks for the submission of at least one photographic image that is relevant to a category in a set of categories, the tasks being performed sequentially;
- providing instructions for causing a representation of each of the set of categories to be displayed on the game playing device;
- for each of the tasks:
  - providing instructions for receiving the player's selection of one of the categories in the set which has not yet been selected from the game playing device,
  - for the player's selected category, providing instructions for receiving a photographic image submitted by the game playing device;
  - providing instructions for computing, with a processor, an image signature for the submitted photographic image based on visual features extracted from the image; and
  - providing instructions for computing a relevance to the category, based on the computed image signature and presenting a score to the player based on the computed relevance for the category before presenting a next of the tasks; and
- providing instructions for outputting a score for the player for the game, based on the computed relevance for each of a plurality of selected ones of the categories of the photographic images submitted by the player.

20. The computer-implemented method of claim 19, wherein the providing for receiving a photographic image submitted by the game playing device comprises providing for upload of a photographic image which is captured by a camera of the game playing device only after receiving the player's selection of the one of the categories.

* * * * *